March 4, 1930. J. F. SCHYLANDER 1,749,396
SOLDERING IRON
Filed Oct. 19, 1927 3 Sheets-Sheet 3
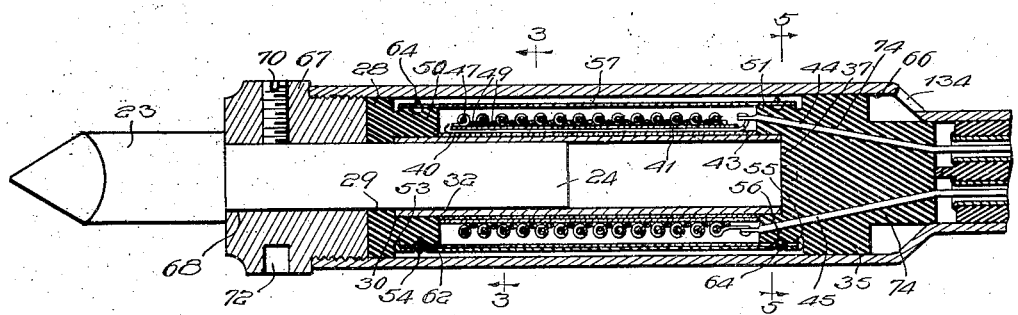
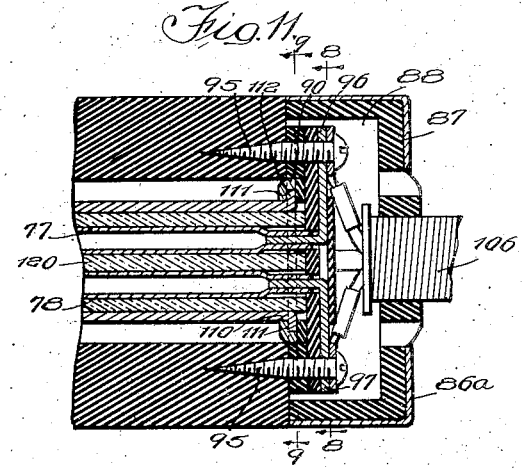
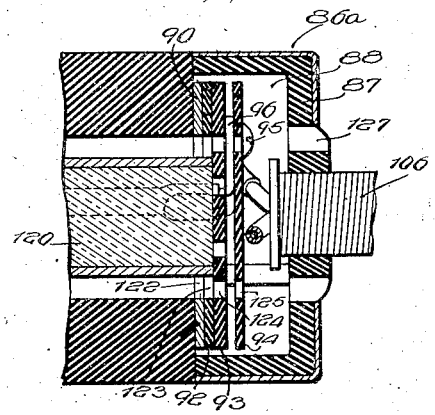
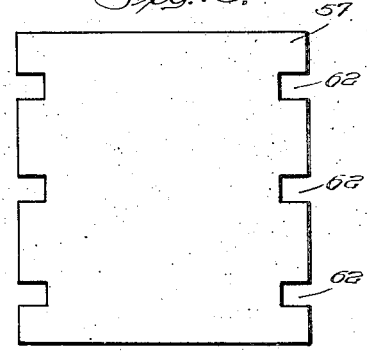
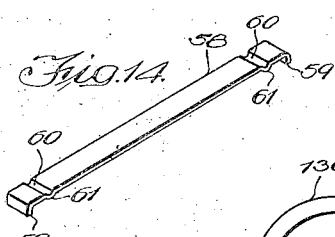
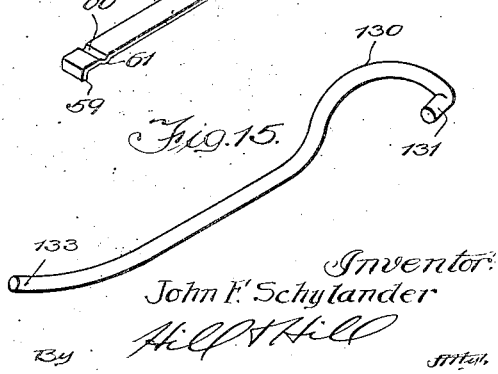

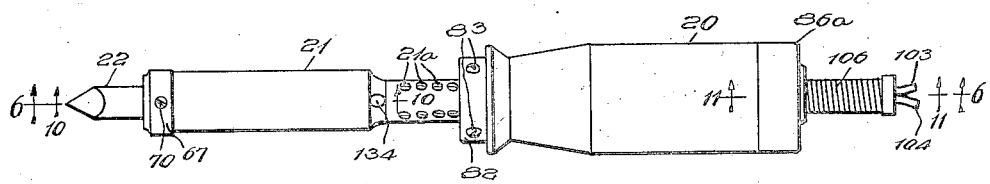

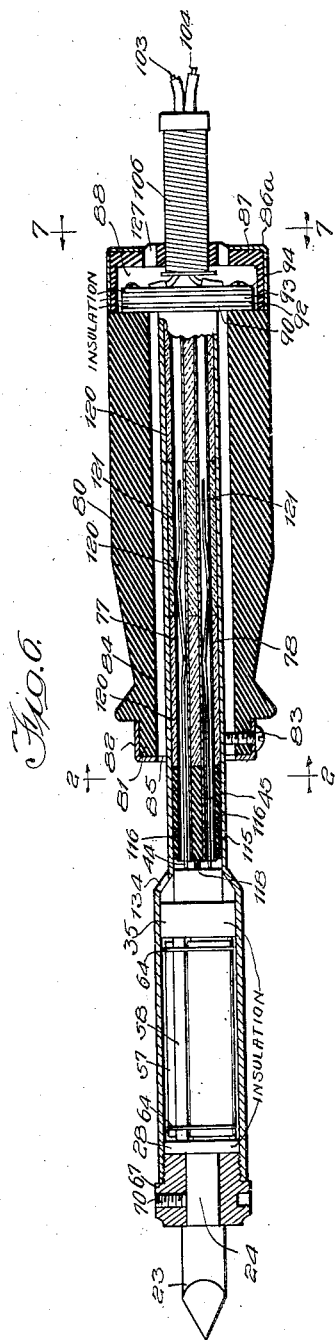

Patented Mar. 4, 1930

1,749,396

UNITED STATES PATENT OFFICE

JOHN F. SCHYLANDER, OF CHICAGO, ILLINOIS

SOLDERING IRON

Application filed October 19, 1927. Serial No. 227,087.

My invention relates broadly to soldering irons and more particularly to soldering irons comprising electrical heating units.

The invention has among its other objects the production of a soldering iron which is of exceedingly durable construction so that a minimum of repair work will be required during the life of the iron.

A particular object of the invention is to produce a soldering iron provided with an improved electrical heating unit which can be quickly and easily replaced.

Another particular object of the invention is to provide a soldering iron having a renewable heating unit which is provided with improved terminals for electrically connecting the unit to the terminals of electrical conductors whereby the soldering iron may be connected to a source of electrical energy.

Still another particular object of the invention is to provide handles of improved construction for electrical soldering irons and improved means carried by the handles for electrically connecting the heating units to the electrical conductors whereby the units are connected to sources of electrical energy.

Many other objects and advantages of the construction herein shown and described will be obvious to those skilled in the art from the disclosure herein given.

To this end my invention consists in the novel construction, arrangement and combination of parts herein shown and described and more particularly pointed out in the claims.

In the drawings wherein like reference characters indicate like or corresponding parts:

Fig. 1 is an elevation of a soldering iron which embodies my invention;

Fig. 2 is an enlarged section taken on line 2—2 of Fig. 6;

Fig. 3 is a section taken on line 3—3 of Fig. 10;

Fig. 4 is an enlarged view of an electrical heating unit which forms part of the improved soldering iron shown in Fig. 1;

Fig. 5 is a section taken on line 5—5 of Fig. 10;

Fig. 6 is an enlarged section taken on line 6—6 of Fig. 1;

Fig. 7 is an enlarged section taken on line 7—7 of Fig. 6;

Fig. 8 is a section taken on line 8—8 of Fig. 11;

Fig. 9 is a section taken on line 9—9 of Fig. 11;

Fig. 10 is an enlarged section taken on line 10—10 of Fig. 1;

Fig. 11 is an enlarged section taken on line 11—11 of Fig. 1;

Fig. 12 is a section taken on line 12—12 of Fig. 9;

Fig. 13 is a developed view of a sheet of mica which forms part of the heating unit shown in Fig. 12;

Fig. 14 is a perspective view of a spacing member which forms part of the improved heating unit; and Fig. 15 is a perspective view of a device which may be employed to remove the improved heating unit from the soldering iron.

Referring to the drawings and particularly to Fig. 1, it will be noted that my improved heating iron preferably comprises a handle, a shank and a soldering point or tip which are designated generally by the reference characters 20, 21 and 22, respectively. The tip 22 may be of any suitable construction but preferably comprises a head 23 adapted to project from one end of the shank 21 and a shank portion 24 adapted to be inserted in the shank 21 and into the improved electrical heating unit which is designated generally by the reference character 26 (see Figs. 4 and 10).

The electrical heating unit 26 may be of any suitable construction but preferably comprises a collar or annular member 28 provided with a substantially central aperture 29 which is enlarged at one end of the collar as indicated at 30 to receive one end of a spacing sleeve 32. The spacing sleeve 32 is preferably formed from metal but the collar 28 and a plug 35 spaced from the collar are preferably molded from some suitable compound adapted to function as electrical insulation. A recess 37 formed in one end of the plug 35 accommodates one end of the spacing sleeve 32.

Wrapped around the spacing sleeve 32 and disposed intermediate the collar 28 and the plug 35 are two sheets 40 and 41 of mica, or any other suitable electrical insulation. Interposed between the sheets of mica 40 and 41 is part of an electrical conductor 43 which has one of its ends secured to a terminal member 44 and has the other of its ends secured to a terminal member 45. Intermediate its ends, the conductor 43 is wound helically around a core 47 of asbestos, or any other suitable electrical insulation, the core 47 together with the wire or conductor 43 wrapped around it being helically wound as a unit around the spacing sleeve 32 but being insulated therefrom by the sheets 40 and 41. A strand 49 of asbestos, or any other suitable electrical insulation, is also wrapped around the spacing sleeve 32 and is adapted to space adjacent turns of the core 47 from each other. The electrical resistance of the conductor 43 is relatively high and it functions as a heating element when it is connected to any suitable source of electrical energy.

It will be noted that the collar 28 and the plug 35 are provided with substantially cylindrical bosses 50 and 51, respectively, of reduced diameter. The boss 50 is provided with annular grooves 53 and 54 and the boss 51 is provided with corresponding annular grooves 55 and 56. Wrapped around the bosses 51 and 50 and extending therebetween is a sheet 57 of mica, or any other suitable electrical insulation, and resting upon the outer surface of the sheet 57 are a plurality of spacing bars 58, each of which is provided at its ends with lugs 59 adapted to engage the grooves 53 and 55 provided in the bosses 50 and 51, respectively. Intermediate its ends, each of the spacing members 58 is bent to provide a plurality of grooves 60 in one of its faces and corresponding lugs 61 in the opposite face, the lugs 61 being adapted to engage the grooves 54 and 56. To permit the lugs 61 to enter the grooves 54 and 56, the sheet 57 is preferably provided with a plurality of notches 62 (see Figs. 10 and 13). Two wires 64 wrapped around the sheet 57 rest in the grooves 60 and hold the spacing elements 58 in place, the wires 64 being also adapted to hold the ends of the sheet 57 in place upon the bosses 50 and 51.

The heating unit 26 is mounted in a chamber 66 provided in the outer end of the shank 21, the outer end of the shank 21 being preferably of larger diameter than the remainder of the shank to provide the chamber. Screwthreaded into the annular end of the shank 21 is a plug 67 which is preferably formed from metal and is provided with a substantially central bore 68, the bore 68 being aligned with the aperture 29 provided in the collar 28 and with the passage through the spacing sleeve 32. The shank portion 24 of the tip 22 preferably fits snugly in the bore 68, the aperture 29 and the passage through the spacing sleeve 32, the construction being such that the tip 22 may be quickly and easily renewed at any time. To prevent accidental displacement of the tip 22 relative to the remainder of the soldering iron, I preferably provide a set screw 70 in the plug 67. The plug 67 is preferably provided with one or more holes 72 adapted to be engaged by a spanner wrench, or the equivalent, when the plug is being assembled with the remainder of the soldering iron or is being removed therefrom.

The terminals 44 and 45 may be of any suitable construction but preferably are formed from relatively long wires or rods which pass through bores 74 formed in the plug 35. As best shown in Fig. 4, the rods or terminal members 44 and 45 are preferably bent intermediate their ends to provide portions 76 adapted to frictionally engage the interior surfaces of metallic tubes 77 and 78 carried by the handle 20. The purpose of this construction will presently appear.

The handle 20 preferably comprises a tubular member 80, formed of wood, or any other material having heat and electrical insulating properties. At its forward end, the tubular member 80 is provided with an integral cylindrical boss 81 which projects into a cup-shaped metallic member 82, the member 82 being secured by a plurality of screws 83, or the equivalent, to the boss. As shown, the screws 83 engage the outer surface of the shank 21 and hold it in a substantially central position in a bore 84 which extends through the tubular member 80. Of course, the screws 83 may be tightened from time to time to prevent relative movement between the shank 21 and the tubular member 80. The cup-shaped member 82 is preferably provided with a plurality of openings 85 which permit the bore 84 to communicate with the atmosphere. Secured to the rear end of the tubular member 80 by screws 86, or the equivalent, and a metallic cup-shaped member 86ª is a cup-shaped member 87 which provides a substantially cylindrical chamber 88 at the rear end of the tubular member 80. The member 87 is preferably formed from wood, or the equivalent. Positioned within the chamber 88 and bearing against the rear end of the tubular member 80 is a metallic disk 90 which, together with a plurality of disks 92, 93 and 94, are secured by screws 95, or the equivalent, to the tubular member 80. The disks 92, 93 and 94 are preferably formed from electrical insulation and the disk 92 preferably rests against the disk 90. The disk 93 preferably rests against the disk 92 and the disk 94 is preferably spaced from the rear surface of the disk 93 so that a pair of substantially L-shaped metallic members 96 and 97 may be clamped between the disks 93 and 94. As best shown in Fig. 11, the rear ends of the metallic tubes 77 and 78 are secured to the members 96 and 97, respectively. In this instance, the rear ends of the tubes 77 and 78 are flattened upon the members 96 and 97, respectively, so that the members are clamped thereto. It will be noted that the disk 90 is provided with notches 100 which accommodate washers 101 formed from electrical insulation, the washers 101 being adapted to insulate the disk 90 from the screws 95. Two conductors 103 and 104 adapted to connect the soldering iron to any suitable source of electrical energy (not shown) are connected to the L-shaped members 96 and 97, respectively, the screws 95 being employed for this purpose. The conductors 103 and 104 are preferably provided with insulating covers and pass through a flexible tubular member 106 which is preferably formed from coiled wire and is preferably carried by the cup-shaped member 87.

Referring now to Figs. 9 and 11, the disk 90 is provided with a central aperture 110 adapted to snugly engage the outer surface of the rear end of the shank 21. A plurality of notches 111 formed in the disk 90 accommodate a like number of lugs 112 struck up upon the rear end of the shank 21, the lugs 112 being clamped between the disk 90 and the insulating disk 92. Obviously, the shank 21 is held against longitudinal displacement relative to the tubular member 80.

The forward ends of the metallic tubes 77 and 78 are flanged over to engage an insulating member 115 which is provided with bores 116 for the tubes. A flange or lug 118 is preferably formed upon the insulating member 115 to prevent the tubular members 77 and 78 from being engaged simultaneously by either one of the terminal members 44 and 45 when the heating unit 26 is inserted in or withdrawn from the shank 21. Interposed between the insulating member 115 and the disk 90 are a plurality of insulating members 120 provided with aligned bores 121 through which the metallic tubes 77 and 78 pass. It will be noted that the external diameters of the insulating members 115 and 120 are substantially equal to the internal diameter of the rear end of the shank 21 so that the metallic tubes 77 and 78 are rigidly held in place within the shank.

Referring now to Fig. 12, it will be noted that the disks 90, 92, 93 and 94 are provided with aligned notches or apertures 122, 123, 124 and 125, respectively, which form a passage whereby the bore 84 of the handle 80 may communicate with the chamber 88. The cup-shaped member 87 is provided with a plurality of apertures 127 through which the chamber 88 may communicate with the atmosphere. Obviously, air will circulate through the bore 84 so that the tubular member 80 of the handle 20 will remain relatively cool at all times. A plurality of apertures 21ª are preferably formed in the shank 21 so that the rear end of it will remain relatively cool.

In Fig. 15 I have shown a tool 130 which I preferably provide in connection with my improved soldering iron. One end of the tool 130 is formed to provide a spanner wrench 131 which is engageable with the holes 72 provided in the plug 67 so that the tool may be employed to assemble the plug with the remainder of the soldering iron or to unscrew the plug from the shank 21. The other end of the tool 130 is preferably curved as indicated at 133 and may be inserted through an aperture 134 provided in the shank 21 to engage the plug 35. Obviously, if the head 23 and the plug 67 are first removed from the shank 21, the tool 130 may be inserted through the aperture 134 and the heating unit 26 may be driven out of the chamber 66. Of course, when the heating unit is removed from the shank 21 in this manner, the rods or terminals 44 and 45 are withdrawn from the metallic tubes 77 and 78.

My improved soldering iron is used in substantially the same manner as other soldering irons of this type but it will be readily understood that the point or tip 22 may be renewed at any time as it is only necessary to unscrew the set screw 70 a few turns when the used point or tip is to be withdrawn from the tool. Of course, when the new tip or point is inserted in the tool, the set screw 70 is again tightened.

The heating unit 26 may be quickly and easily replaced. When it is to be replaced, the tip 22 and the plug 67 are first removed from the shank 21 and then the curved end 133 is inserted through the aperture 134 in the shank 21 and the unit is pushed out of the chamber 66. The terminals or rods 44 and 45 are rigidly secured to the unit 26 and therefore, when the unit is removed from the shank, the terminals are also removed therefrom. When the rods or terminals 44 and 45 are so withdrawn from the tubes 77 and 78, the bent portions 76 of the terminals frictionally engage the interior surfaces of the metallic tubes 77 and 78 and clean them. Then when a new unit 26 is inserted in the shank, the bent portions 76 of the terminals 44 and 45 thereof also wipe the interior surfaces of the metallic tubes 77 and 78 and insure that a good electrical contact will be established between the terminals and the metallic tubes. After a new unit has been placed in the shank, the plug and the tip 22 are replaced.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. A device of the kind described comprising a soldering tip, means carrying said tip, electrical terminal members fixed in said means, and an electrical heating unit removably mounted in said means, and provided with electrical terminal members slidably engageable with the first-mentioned terminal members.

2. A device of the kind described comprising a soldering tip, means carrying said tip, tubular metallic members mounted in said means, and adapted to be connected to a source of electrical energy, and an electrical heating unit mounted in said means and provided with electrical terminal members insertable in said tubular metallic members and slidably engageable therewith.

3. A device of the kind described comprising a soldering tip, means carrying said tip, tubular metallic members mounted in said means and adapted to be connected to a source of electrical energy, and an electrical heating unit removably mounted in said means and provided with rods forming electrical terminals insertable in said tubular members and having bent portions engageable with the interior surfaces of said tubular members.

4. A soldering iron comprising a handle, a tubular shank projecting from the handle and open at its outer end, electrical terminal members carried by and fixed with respect to said handle and said shank, an electrical heating unit mounted in said shank and removable through said open outer end thereof, said unit having electrical terminal members engageable with the first-mentioned terminal members and slidably detachable therefrom, means for preventing accidental loss of said heating unit from said shank through said open outer end, and a soldering tip removably mounted at the outer end of said shank and having a portion thereof disposed in close proximity to said heating unit.

5. A soldering iron comprising a handle, a tubular shank projecting from the handle and open at its outer end, tubular metallic members fixed with respect to said shank and adapted to be connected to a source of electrical energy, an electrical heating unit mounted in said shank and removable therefrom through said open outer end thereof, electrical terminal members carried by said unit and slidably engageable with the interior surfaces of said tubular metallic members, means for preventing accidental displacement of said unit relative to said shank, and a soldering tip positioned at the outer end of said shank and having a portion thereof arranged in close proximity to said heating unit.

6. An electrical heating unit comprising spaced members formed of electrical insulation, one of said members having an aperture therethrough, a metallic sleeve extending between said members and aligned with said aperture, a resistance wire wound around said sleeve and electrically insulated therefrom, and a pair of metallic rods electrically connected to said wire and projecting from one of said members for engagement with cooperating electrical terminal members.

7. An electrical heating unit comprising spaced members formed of electrical insulation, one of said members having an aperture therethrough, a metallic sleeve extending between said members and aligned with said aperture, a resistance wire wound around said sleeve and electrically insulated therefrom, and a pair of metallic rods electrically connected to said wire and projecting from one of said members for slidable engagement with cooperating electrical terminal members, the portions of said rods adapted to slidably engage said cooperating electrical terminal members being bent to clean said electrical terminal members.

8. In a soldering iron, the combination with a soldering tip, of an electrical heating unit comprising spaced members formed from electrical insulation and provided with annular grooves thereon, one of said members being provided with an aperture therethrough, a metallic sleeve extending between said members and aligned with said aperture, an electrical resistance element disposed around said sleeve and insulated therefrom, a flexible sheet wrapped around said members and extending therebetween, spacing bars extending between said members and placed upon the outer surface of said sheet, and wires wrapped around said members for securing the bars and sheet thereto, said soldering tip being insertable in said sleeve through said aperture.

9. A soldering iron comprising a tubular shank having an aperture therein intermediate its ends, an electrical heating unit removably mounted in said shank and arranged with sliding contacts so that a tool may be inserted through said aperture and employed to eject the unit from the shank, and a soldering tip arranged in close proximity to said heating unit.

10. In a soldering iron, the combination with a soldering tip, of an electrical heating unit comprising a pair of conducting rods, a handle, and a pair of tubular conductors mounted in said handle and insulated therefrom, said tubular conductors receiving said rods and making positive electric contact therewith.

11. In a soldering iron, the combination with a soldering tip, of an electrical heating unit comprising a pair of conducting rods, a handle, and a pair of tubular conductors mounted in said handle and insulated therefrom, said tubular conductors receiving said rods and making positive electric contact therewith, and said handle having an air space surrounding said tubular conductors with an aperture leading to the outer air at each end thereof.

12. In a soldering iron, the combination with a soldering tip, of an electrical heating unit comprising a pair of conducting rods, a handle, a pair of tubular conductors mounted in said handle and insulated therefrom and adapted to receive said rods, and means on said rods for wiping the interior of said tubular conductors when said heating unit is mounted on or demounted from said handle.

13. In a soldering iron, the combination with a soldering tip, of an electrical heating unit comprising a pair of conducting rods, a handle, a pair of tubular conductors mounted in said handle and insulated therefrom and adapted to receive said rods, said rods being bent so as to wipe the interior of said tubular conductors when said heating means is mounted on or dismounted from said handle.

14. In a soldering iron, the combination with a soldering tip, of an electrical heating unit comprising a pair of conducting rods, a handle, a pair of tubular conductors mounted in said handle and insulated therefrom and adapted to receive said rods, and means on said rods for wiping the interior of said tubular conductors when said heating unit is mounted on or demounted from said handle, said handle having an air space surrounding said tubular conductors with an aperture leading to the outer air at each end thereof.

15. In a soldering iron, the combination with a soldering tip, of an electrical heating unit comprising a pair of conducting rods, a handle, a pair of tubular conductors mounted in said handle and insulated therefrom and adapted to receive said rods, said rods being bent so as to wipe the interior of said tubular conductors when said heating unit is mounted on or dismounted from said handle, said handle having an air space surrounding said tubular conductors with an aperture leading to the outer air at each end thereof.

In testimony whereof, I have hereunto signed my name.

JOHN F. SCHYLANDER.